Patented Oct. 26, 1937

2,096,878

UNITED STATES PATENT OFFICE 2,096,878

MANUFACTURE OF ALIPHATIC ALCOHOLS

Benjamin T. Brooks, Old Greenwich, Conn., assignor to Standard Alcohol Co.

No Drawing. Application October 9, 1934, Serial No. 747,508

7 Claims. (Cl. 260—156)

This invention relates to improvements in the manufacture of aliphatic alcohols and relates particularly to the manufacture of ethyl alcohol from ethylene.

In the conversion of ethylene to ethyl alcohol by reacting upon the ethylene with sulfuric acid, it is economically advantageous to continue the absorption of the ethylene until a substantial proportion of diethyl sulfate is formed in the acid reaction mixture. The maximum proportion of ethylene to acid would be two mols of ethylene to one of sulfuric acid to form diethyl sulfate exclusively. In practice, however, the reaction rate of the ethylene and the acid mixtures is much retarded after a substantial proportion of diethyl sulfate is formed so that the acid reaction mixture commonly consists of a mixture of diethyl sulfate and ethyl hydrogen sulfate, or ethyl sulfuric acid, with perhaps very minor proportions of free sulfuric acid or sulfuric acid and water.

When this reaction mixture is diluted with water with the object of hydrolyzing the sulfuric esters to ethyl alcohol and the mixture is heated to distill out the alcohol, the resulting yield of alcohol is not quantitative but is diminished by the formation of a substantial proportion of ethyl ether. The dilution of the acid reaction mixture with very large proportions of water diminishes the proportion of ether formed, but adds greatly to the cost of the operation if the diluted acid is restored or re-concentrated.

It was found that when an acid reaction mixture containing 1.5 mols of ethylene combined with 1 mol. of sulfuric acid is diluted with water equivalent to 65 parts by weight of water to 35 parts by weight of the sulfuric acid originally used, and the diluted mixture is hydrolyzed and distilled, the proportions of ether and alcohol formed are about 15 to 20 mols of ether to 85 or 80 mols of ethyl alcohol.

It was found that diethyl sulfate reacts very easily with ethyl alcohol to form ethyl ether, and that in an aqueous alcoholic reaction mixture, a given quantity of diethyl sulfate will form increasingly large proportions of ethyl ether as the concentration of ethyl alcohol in the mixture is increased. When it is desired to minimize the production of ethyl ether, it was found to be advantageous to remove the diethyl sulfate from the diluted acid reaction mixture and separately hydrolyze the diethyl sulfate with water or dilute acid containing initially no ethyl alcohol, thus minimizing the formation of ethyl ether. In order to separate the diethyl sulfate the original sulfuric acid reaction mixture is diluted with water to give a mixture containing about 50 parts by weight of acid, calculated as sulfuric acid to 50 parts by weight of water, or larger proportions of water. Generally, it is not advantageous to add more than 90 parts by weight of water to 10 parts of acid, and about 65 parts by weight of water to 35 parts of sulfuric acid is preferred. Within these limits of dilution by water the diethyl sulfate is sparingly soluble and separates as an insoluble oily liquid. The diethyl sulfate may be mechanically removed from the diluted acid reaction mixture in any suitable manner, as by decantation or by the acid of a centrifuge.

The separated diethyl sulfate is then separately hydrolyzed by water or dilute acid and when hydrolysis has proceeded far enough to form ethyl sulfuric acid and the oily diethyl sulfate has practically disappeared as a separate phase, the partially hydrolyzed material may be added to the original diluted acid reaction mixture, from which the diethyl sulfate was separated, and the hydrolysis carried further and heated to distill ethyl alcohol from the mixture, or the hydrolysis of the diethyl sulfate can be carried to completion and the solution separately distilled to obtain alcohol.

The hydrolysis of the diethyl sulfate is preferably carried out in a dilute sulfuric acid solution with sufficient water to yield ultimately an aqueous sulfuric acid solution containing about 35 parts of sulfuric acid to 65 parts by weight of water. The hydrolysis is carried out by vigorously agitating the mixture of water and diethyl sulfate and warming preferably to 50–80° C.

The formation of large proportions of diethyl sulfate is favored by absorbing the ethylene under pressures of 250 lbs. per square inch, or more, and using sulfuric acid of 90 to 100% $H_2SO_4$ at temperatures within the range of 60° to 100° C., preferably 75° to 80° C.

This process is not limited to the preparation of ethyl alcohol as it may be used in the preparation of alcohols from other olefines, such as in the manufacture of isopropyl alcohol.

The foregoing description is merely illustrative and various changes and alternative arrangements may be made within the scope of the appended claims in which it is my intention to claim all inherent novelty in the invention as broadly as the prior art permits.

I claim:

1. In the manufacture of aliphatic alcohols from olefines, the process which comprises absorbing about 1.5 mols of an olefine of the group consisting of ethylene and propylene in about 1 mol. of sulfuric acid to form a dialkyl sulfate, adding water to the acid mixture containing dialkyl sulfate until the dialkyl sulfate separates as an insoluble layer, separating the layers and hydrolyzing the separated dialkyl sulfate to form an aliphatic alcohol.

2. In the manufacture of aliphatic alcohols from olefines, the process which comprises absorbing about 1.5 mols of an olefine of the group consisting of ethylene and propylene in about 1 mol. of sulfuric acid to form a dialkyl sulfate, adding water to the acid mixture containing the dialkyl sulfate until the dialkyl sulfate separates as an insoluble layer, hydrolyzing the separated dialkyl sulfate to form an aliphatic alcohol and subjecting to distillation to obtain aliphatic alcohol.

3. In the manufacture of aliphatic alcohols from olefines, the process which comprises absorbing about 1.5 mols of an olefine of the group consisting of ethylene and propylene in about 1 mol. of sulfuric acid to form a dialkyl sulfate, adding water to the acid mixture until the dialkyl sulfate separates as an insoluble layer, separately hydrolyzing the dialkyl sulfate layer to form an aliphatic alcohol, adding the hydrolyzed mixture to the first separated layer and subjecting the whole mixture to distillation to obtain an aliphatic alcohol.

4. In the manufacture of ethyl alcohol from ethylene, the process which comprises absorbing about 1.5 mols of ethylene in about 1 mol. of sulfuric acid to form diethyl sulfate, adding water to obtain a mixture containing from 50 to 90 parts by weight of water to 10 to 50 parts by weight of sulfuric acid, allowing the mixture to settle and form layers, separating the layers and hydrolyzing the separated layer of diolefine sulfate to form an aliphatic alcohol.

5. In the manufacture of ethyl alcohol from ethylene, the process which comprises absorbing about 1.5 mols of ethylene under a pressure of at least 250 lbs. per square inch in about 1 mol. of sulfuric acid to form a diolefine sulfate, diluting the mixture of sulfuric acid and diolefine sulfate with water until a separate layer of diolefine sulfate is obtained, separating the layers and hydrolyzing the separated ethylene sulfate layer to obtain ethyl alcohol.

6. In the manufacture of ethyl alcohol from olefines according to claim 5, in which the sulfuric acid used to absorb ethylene is of 90 to 100% strength.

7. In the manufacture of ethyl alcohol from ethylene, the process according to claim 5, in which the ethylene is absorbed in the sulfuric acid at a temperature of 60° to 100° C.

BENJAMIN T. BROOKS.